United States Patent
Desai et al.

(10) Patent No.: US 12,182,811 B1
(45) Date of Patent: Dec. 31, 2024

(54) ELECTRONIC TRANSACTION VERIFICATION SYSTEM

(71) Applicant: United Services Automobile Association (USAA), San Antonio, TX (US)

(72) Inventors: Snehal Desai, Richardson, TX (US); Jennifer Hunt Erickson, San Antonio, TX (US); Joel S. Hartshorn, Liberty Lake, WA (US); Yevgeniy Viatcheslavovich Khmelev, San Antonio, TX (US); Jeanie Graciela Lopez, San Antonio, TX (US); Bharat Prasad, San Antonio, TX (US); Nolan Serrao, San Antonio, TX (US); Thomas Wayne Schwarz, Jr., Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/962,950

(22) Filed: Oct. 10, 2022

Related U.S. Application Data

(63) Continuation of application No. 16/879,520, filed on May 20, 2020, now Pat. No. 11,494,767.

(60) Provisional application No. 62/850,932, filed on May 21, 2019.

(51) Int. Cl.
*G06Q 20/40* (2012.01)
*G06Q 20/38* (2012.01)
*G06Q 30/0207* (2023.01)
*G06Q 30/0214* (2023.01)
*H04L 9/06* (2006.01)
*H04L 9/00* (2022.01)

(52) U.S. Cl.
CPC ....... *G06Q 20/401* (2013.01); *G06Q 20/3829* (2013.01); *G06Q 30/0214* (2013.01); *G06Q 30/0239* (2013.01); *H04L 9/0637* (2013.01); *H04L 9/50* (2022.05); *H04L 2209/56* (2013.01)

(58) Field of Classification Search
CPC . G06Q 20/401; G06Q 20/3829; H04L 9/0637
See application file for complete search history.

(56) References Cited

U.S. PATENT DOCUMENTS

| | | | |
|---|---|---|---|
| 9,741,036 B1* | 8/2017 | Grassadonia | G06Q 20/405 |
| 10,341,309 B1 | 7/2019 | Ramirez et al. | |
| 10,929,870 B1 | 2/2021 | Chokhawala et al. | |
| 11,010,831 B1 | 5/2021 | Tarmann et al. | |
| 2008/0071619 A1 | 3/2008 | Charlton et al. | |

(Continued)

FOREIGN PATENT DOCUMENTS

WO 2013017029 A1 2/2013

*Primary Examiner* — Scott C Anderson
(74) *Attorney, Agent, or Firm* — Fletcher Yoder, P.C.

(57) ABSTRACT

The present disclosure includes systems and methods for facilitating management of information related to electronic transactions. More specifically, the methods and systems discussed herein related to electronic transaction verification techniques that employ distributed computation methods, such as blockchains, to store transactional data for various web-based interactions, and to verify a transaction source and generate customer offers for these transactions.

20 Claims, 5 Drawing Sheets

(56) References Cited

U.S. PATENT DOCUMENTS

| | | | |
|---|---|---|---|
| 2008/0301562 A1* | 12/2008 | Berger | G06F 16/958 |
| | | | 715/733 |
| 2010/0312636 A1* | 12/2010 | Coulter | G06Q 30/02 |
| | | | 705/44 |
| 2014/0282368 A1 | 9/2014 | Howard | |
| 2015/0310476 A1* | 10/2015 | Gadwa | G06Q 30/0226 |
| | | | 705/14.27 |
| 2016/0098519 A1* | 4/2016 | Zwir | G16B 20/00 |
| | | | 702/19 |
| 2018/0336583 A1* | 11/2018 | Hammock | G06Q 30/0211 |
| 2018/0374131 A1* | 12/2018 | Currie | G06Q 30/0617 |
| 2019/0087847 A1* | 3/2019 | Peasley | G06Q 30/0236 |
| 2019/0147487 A1* | 5/2019 | Lee | G06Q 30/0209 |
| | | | 705/14.73 |
| 2020/0153606 A1 | 5/2020 | Li et al. | |

* cited by examiner

ELECTRONIC TRANSACTION VERIFICATION SYSTEM

CROSS-REFERENCE TO RELATED APPLICATION

This application is a continuation of U.S. patent application Ser. No. 16/879,520, entitled "ELECTRONIC TRANSACTION VERIFICATION SYSTEM," filed May 20, 2020, which claims priority to and the benefit of U.S. Provisional Application No. 62/850,932, entitled "ELECTRONIC TRANSACTION VERIFICATION SYSTEM," filed May 21, 2019, which is hereby incorporated by reference in its entirety for all purposes.

BACKGROUND

The present disclosure relates generally to methods and systems to facilitate managing information related to electronic transactions. More specifically, the methods and systems discussed herein relate to electronic transaction verification techniques that employ distributed computation methods, such as blockchains, to store transactional data for various interactions, to verify a transaction source and generate customer offers for these transactions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

For electronic transactions, such as a car rental, a hotel reservation, flight reservations, among others, consumers often book these types of rentals and/or reservations online. Such transactions are often completed on different (e.g., third-party) websites that are accessed via click-through interactions. Indeed, many electronic transactions are completed on third-party websites after searches or interactions that begin on a different originating website that provides the referral that leads to the completion of the transaction. It is now recognized that referring companies may benefit from proving that their website was the original source of the user's traffic.

SUMMARY

In a first embodiment, a method for verifying a source of an electronic transaction and creating an immutable record is disclosed. The method may include receiving interaction data, such as data relating to a platform of the interaction, and completing a transaction verification based on the interaction data. The method also includes determining the source of the electronic transaction and creating an immutable record once the source of the electronic transaction is verified.

In a second embodiment, a computer implemented method includes receiving interaction data indicative of a first user from a platform-specific interaction relating to an electronic transaction. The computer implemented method also includes verifying a source of the electronic transaction based in part on the interaction data to create a verification record, and providing the verification record of the electronic transaction to a second user when queried by the second user, wherein the verification record is provided via a blockchain system.

In a third embodiment, a tangible, non-transitory, machine-readable medium, comprising machine-readable instructions that, when executed by one or more processors, cause the one or more processors to receive interaction data indicative of a platform-specific interaction relating to an electronic transaction of a first user, where the platform-specific interaction comprises interaction with a tool to direct the first user from a platform of the platform-specific interaction to a third party website outside the platform. The machine-readable instructions that, when executed by one or more processors, cause the one or more processors to verify a source of the electronic transaction based in part on the interaction data, and provide verification of the electronic transaction to a second user based on a query by the second user.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The process of determining a source of an electronic transaction, such as a car rental or hotel reservation, may take into account, among other things, the user's previous rentals, the source of the online transaction, and/or the user's preferences. This information may be collected via interactions, such as web browser-based interactions and/or application-specific interaction.

The present disclosure discusses methods and systems for verifying sources of electronic transactions, which upon being verified, may create immutable records that may be stored in a blockchain. As such, the present methods and systems may include, for example, application program interfaces (APIs), blockchain techniques including but not limited to verification mechanisms, as well as terminals and servers that operate blockchain nodes and/or API nodes, as described herein. One such verification mechanism that may be utilized is the use of transaction completion tools (i.e., link, purchase button, complete transaction button, etc.) to verify a source of an electronic transaction and/or access a deal on a third-party site. The embodiments described herein also describe generating customer-specific offers based on the user's electronic transaction.

Figure 1:
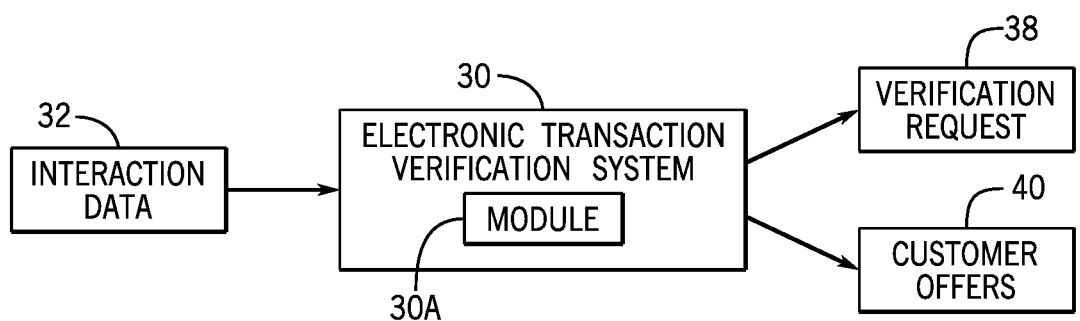
FIG. 1 is an illustration of an electronic transaction verification system that may be used to generate a verification for an electronic transaction, in accordance with an embodiment.

With the foregoing in mind, FIG. 1 illustrates electronic transaction verification system 30. The electronic transaction verification system 30 may store and track the histories of electronic transactions made via the web. In certain embodiments, the electronic transaction verification system 30 may record blockchain information received from potential customers. The electronic transaction verification system 30 may receive interaction data 32 that may include user profile information, information about other click-throughs (cookies) as well as platform-specific information, such as whether the interaction originated using a platform-specific application or a web browser and whether the interaction was via a mobile device, tablet, application, and so forth to access a booking or other transaction website (e.g., for tickets, bookings, seats, etc.). Interaction data 32 may be further understood with reference to FIG. 4. It may be appreciated that, upon accessing a particular website, the electronic transaction verification system 30 may record interaction data 32 including how a user has accessed the particular website (e.g., via a cell phone, desktop, etc.). The electronic transaction verification system 30 may also store data about the transaction including whether the transaction was completed via the initial method of access (e.g., via the cell phone, application, etc.) or if the transaction was interrupted. The examples described above are illustrative of the type of information relating to electronic transactions that may be stored, but is not limiting. Based on the information recorded in the electronic transaction verification system for a given electronic transaction, the electronic transaction verification system may provide a verification 38 for the electronic transaction. In certain embodiments, the verification 38 may be continuously or periodically calculated, or may only be calculated upon request. In certain embodiments, the electronic transaction verification system 30 may also provide a customer offer 40 for the electronic transaction. The customer offer 40 may provide one or more customer offers associated with the electronic transaction that is recorded in the electronic transaction verification system 30.

Figure 2:
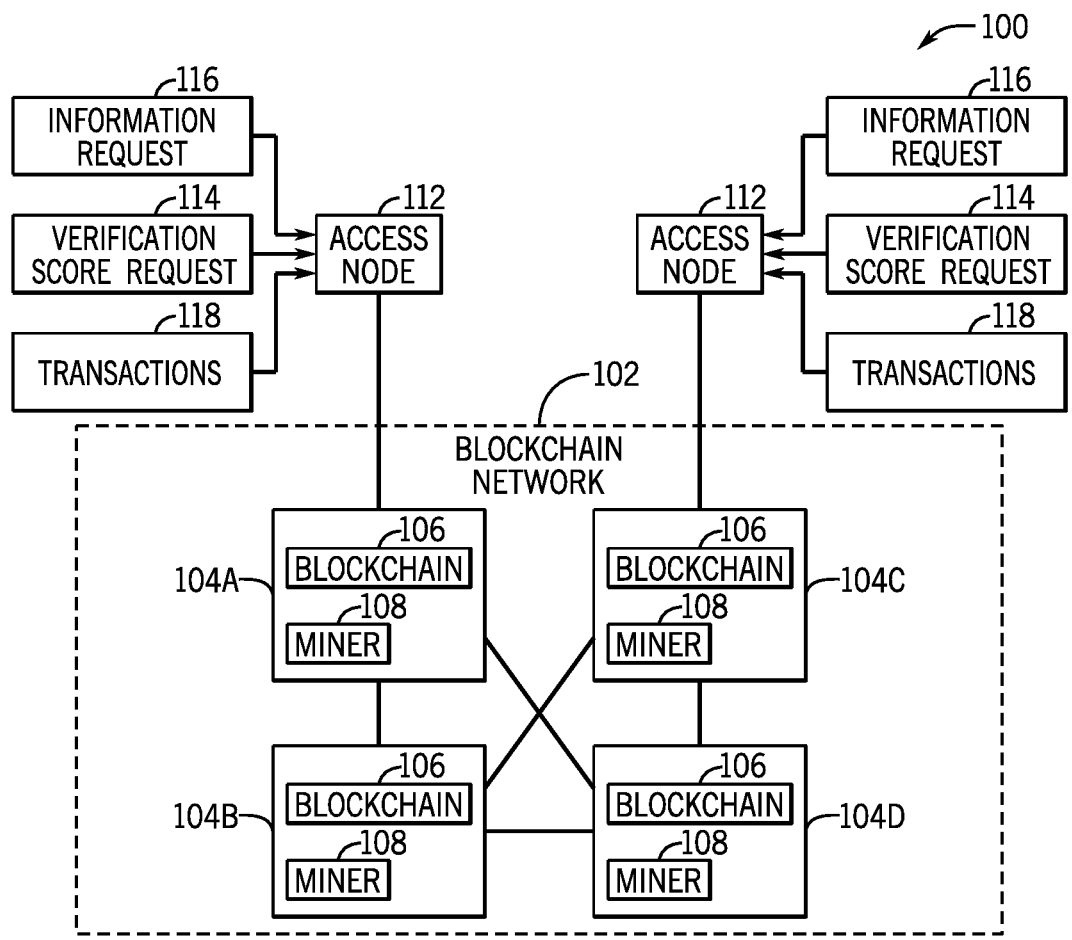
FIG. 2 is an illustration of a blockchain and electronic transaction verification system infrastructure that may be used to generate a verification for an electronic transaction, in accordance with an embodiment.

With the foregoing in mind, FIG. 2 illustrates a blockchain system 100 that may be used to perform recordation of information associated with electronic transactions, such as the electronic transaction verification system 30 of FIG. 1. Accordingly, as provided herein, the disclosed interactions and origination information may be part of a blockchain record for an electronic transaction. In addition to the origination information, the blockchain record may include or may refer to interaction data that ties the blockchain record to, for example, a platform of origin. That is, in addition to recording information that indicates that a particular user originated from a particular website or application, the blockchain record may include or refer to other records that specify that the interaction was via a mobile device or via a particular type of originating website. In a specific example, the blockchain record may include information indicative of the originating source to a third party transaction. Accordingly, a referral site that includes one or more links or buttons to third party sites may record to the blockchain outgoing clicks from the originating referral site to the one or more outbound links. Once the user has clicked or navigated away from the referral site using the outgoing clicks, the blockchain record may be updated to reflect any purchases or further transactions on the third party site. In this manner, depending on the relationship between the originating referral site and the owner or owners of the outbound links, any existing agreements based on referrals may be verified and fulfilled using the blockchain record. Further, because updates to the blockchain record for each user interaction may track the user throughout the individual transaction, verification may be more accurate. In one embodiment, a particular user may click through from an originating site to a car purchasing site to purchase a car. Even if the user clicks away from the car purchasing site to do independent research, the referral interaction is nonetheless part of the immutable blockchain record and, therefore, may be used to fulfill any existing referral agreements.

As discussed, the interaction from an originating site to a referral or outbound site is recorded to the blockchain, and the blockchain record may be tied to a particular user via the interaction data. For example, if the originating site is part of an application operating on a mobile device, the interaction is tied to a user profile stored in the application.

In certain embodiments, the blockchain record may refer to a specific platform of the user, e.g., mobile devices, desktops, to assess the effectiveness of types of referrals on different platforms. Mobile device or mobile application users may prefer different types of referrals relative to desktop users. In this manner, the blockchain record may permit increased granularity of referral interactions by recording not only the referral interaction, but also the platform of the user, certain user interaction data, etc. In addition, the blockchain record may reflect not only the initial outbound click, but also any subsequent purchases or bookings, e.g., within a predefined time period.

The blockchain system 100 may include a blockchain network 102. The blockchain network 102 may be formed by several blockchain nodes, such as blockchain nodes 104A, 104B, 104C, and 104D, which may be implemented by a dedicated server or computer device, or may be implemented as a virtual machine in a shared computer system. Each blockchain node may have in its memory a replicate of the blockchain 106. Each blockchain node 104A-D may also have a miner 108, an application that may verify the integrity of the blockchain, and may also perform operations and/or transactions on the electronic transaction verification records stored in the blockchain 106. The blockchain 106 is a replicated data structure that may have its consistency and integrity preserved by a consensus mechanism performed by the miners 108.

Users may interact with the blockchain network 102 via an access node 112. For example, users may request, through the access node 112, the recordation and/or processing of data, such as a verification request 114, an information request 116 (e.g., a request for the state of the verification request 114), or a transaction request 118 (e.g., a request for a change in a state of the verification request 114) to the blockchain 106. The verification request 114, information requests 116, and/or transaction requests 118, allow users to record information for an online transaction, and may also be used to record data associated with completing the online transaction (e.g., online booking), as described herein. Each access node 112 may be implemented by a computer terminal coupled to the blockchain network 102.

A miner 108 from any of the blockchain nodes 104A, 104B, 104C, and 104D may create an update to the blockchain that persists (e.g., stores) the received verification request 114 to the blockchain 106. The verification request 114 may be a data structure that may include states (e.g., internal states) and transaction instructions. The transactions, or functions, may include instructions that modify the states of the verification request 114. Examples of verification requests 114 described herein verification requests 114 related to tracking a source of an online booking, calculating verifications, and keeping a balance of transactions associated with the purchase of the online booking. The operation and interaction between verification requests 114 are further described below.

Similarly, a transaction request 118 may be received by any miner 108 of the blockchain nodes 104A, 104B, 104C, and 104D via an access node 112. The transaction request 118 may perform operations that cause a change in the state of a verification request 114 recorded in the blockchain 106. After performing the desired operations and changing the state of the verification request 114, in accordance with the transaction request 118, the miner 108 may update the blockchain 106 to record the updated state of the verification request 114. As with the recordation of the verification request 114, the updated state of the verification request 114 may be propagated to the blockchain nodes 104A-D and verified. An information request 116, similar to a transaction request 118, may be received by a miner 108, and may perform operations associated with a verification request 114. However, in contrast with the transaction request 118, the information request 116 does not lead to changes in the state of the verification request 114 and, thus, updates to the blockchain 106 that results from a successful information request 116 are not performed.

Performance of the operations by the miners 108 of the nodes may be incentivized and/or regulated by exchange of tokens (e.g., currencies) of the blockchain. In public blockchains, updates to the blockchain 106 by a blockchain node 104A-D, from recording a verification request 114 or from performing a transaction request 118, may be rewarded with a blockchain token. Moreover, performance of a transaction request 118 or an information request 116 may be rewarded with a blockchain token. In private blockchains, tokens may be used to implement prioritization mechanisms for the operations and/or to prevent large or faulty operations from blocking the blockchain with arbitrarily long operation times.

Figure 3:
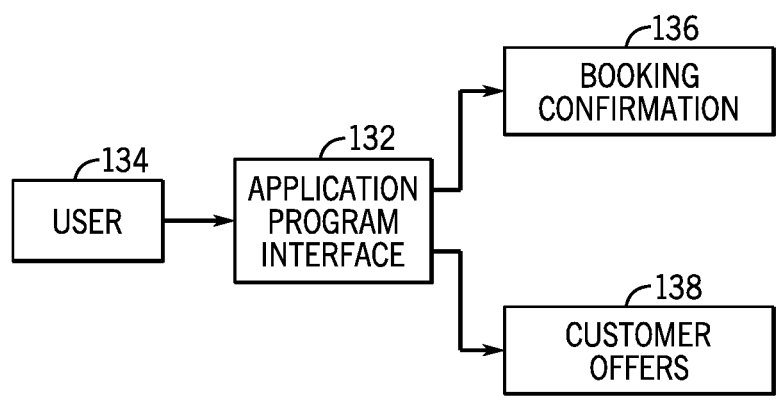
FIG. 3 is an illustration of an application program interface that may be used to verify electronic transactions and generate customer offers, in accordance with an embodiment.

The infrastructure described above in the blockchain system 100 of FIG. 2 may be accessed by an application program interface (API) 132, illustrated in diagram 130 of FIG. 3. The API 132 may be accessed from an access node 112. The API 132 may provide users 134 with an interface to the blockchain network 102. It should be noted that the user 134 may be a human operator accessing using an user interface provided by the API 132 or another software performing calls to a computer-accessible interface (e.g., a library) of the API 132. The API 132 may be loaded as an interface in an access node 112, or a resource available on the internet that may be accessed using a network application (e.g., a browser) in the access node 112. The API 132 may provide tools for creation and interaction with online bookings 136 and/or customized customer offers 138. For example, the API 132 may convert the state and the functions of an online transaction to binary code for storage and execution by miners 108 of the blockchain 106. The API 132 may also convert (e.g., compile) transactions or information requests to a binary message that may be transmitted to the blockchain 106 for execution by miners 108.

The online bookings 136 are online transactions that may be used to store and track certain information for a particular online transaction and to verify a source of the online transaction to create an immutable record of how a user was directed to a particular online booking source. Accordingly, a party may be able to better determine via interaction data and online tracking the source of the online booking 136. By tracking certain information for the online bookings 136, as explained further with reference to FIG. 4, the electronic transaction verification system 30 may utilize a diagnostics mechanism to ensure quality control of determining the source of the online booking 136.

The API 132 may provide customer offers 138 that may be used to generate multiple customer offers by tracking interactions data 140. As explained further with reference to FIG. 4, the multiple customer offers may be targeted towards certain demographics (e.g., age group 25-34, middle aged males, etc.). The users 134 may be presented the customized customer offers 138 of the electronic transaction verification system 30 using APIs 132. Customization of the APIs 132 may allow integration between the electronic transaction verification system 30 and other internal applications of an organization that wishes to access the electronic transaction verification system 30.

In certain embodiments, the API 132 may include the option for verifying online transactions (e.g., booking confirmations 136). The verification of the electronic transaction may include encryption methods using a public/private key infrastructure. It may be appreciated that certain tracking tools may be used to track the source of the electronic transaction. For example, in some embodiments, a link, a purchase button, or a complete transaction button may be used in analyzing a source (e.g., website of origination) of the electronic purchase. An application may provide a link, purchase button, complete transaction button or other transaction completion tool may utilize a unique identifier that directs the user 134 to a third-party website to complete the transaction. Indeed, the application-mediated identifier (e.g., link, purchase button, complete transaction button, or other identifier) may enable a new internet browser window to open to take the user 134 to the third-party website for completing the transaction (e.g., booking a vehicle rental, hotel room, etc.).

In one non-limiting example for a car rental, the electronic transaction verification system 30 may determine via the transaction completion tool (e.g., the link, the purchase button, the complete transaction button) that the user 134 accessed the third-party car rental site (e.g., True Car, Kayak, Expedia, etc.) when the source of the electronic transaction is confirmed. In certain embodiments, the transaction completion tool may be a platform-specific interaction, depending on whether the transaction completion tool was accessed via a website or the user's platform. To confirm the source of the electronic transaction, the electronic transaction verification system 30 may determine that a unique link, purchase button, or complete transaction button was used to link the user 134 to the third-party car rental site to finish the electronic transaction (here to complete the car rental transaction). The unique link, purchase button, or complete transaction button may include a source identifier to indicate the original source of the transaction. For example, if the user 134 is on a website of particular company or on an application of a particular company (e.g., Company X), the user 134 may utilize the transaction completion tool (i.e., link, purchase button, complete transaction button, etc.) to complete a transaction and/or access a deal on a third-party site. The transaction completion tool (e.g., unique link, purchase button, or complete transaction button) may contain a particular reference to the particular company so that the electronic transaction verification system 30 can identify the source of the referral to the third-party site.

Once the electronic transaction verification system 30 has determined the source of the electronic transaction is confirmed by registering the source of the electronic purchase, (e.g., when the verification request is confirmed), an immutable record is created and stored in the blockchain. By creating an immutable record, the referring company (i.e., Company X) can prove that their website and/or application was the source of the user's 134 web traffic to the third-party site (i.e., True Car). As such, it may be easier for the referring company (i.e., Company X) to collect any commission, points, or other reward from the third-party site that the referring company may be owed.

The API 132 may also include the option to generate customized offers based in part on the user's transaction. Indeed, to complete a transaction, the user 134 may specify a type transaction (e.g., vehicle reservation, hotel booking, event tickets, rentals of any kind, etc.) and the API 132 may provide a list of preferences pertinent to the particular transaction type. The user 134 may then choose the preferences (e.g., vehicle model, hotel location, etc.), and provide inputs or parameters associated with the transaction. The API 132 may generate different offers to the user 134 based in part on the interaction data 140, which may be further understood with reference to FIG. 4.

Figure 4:
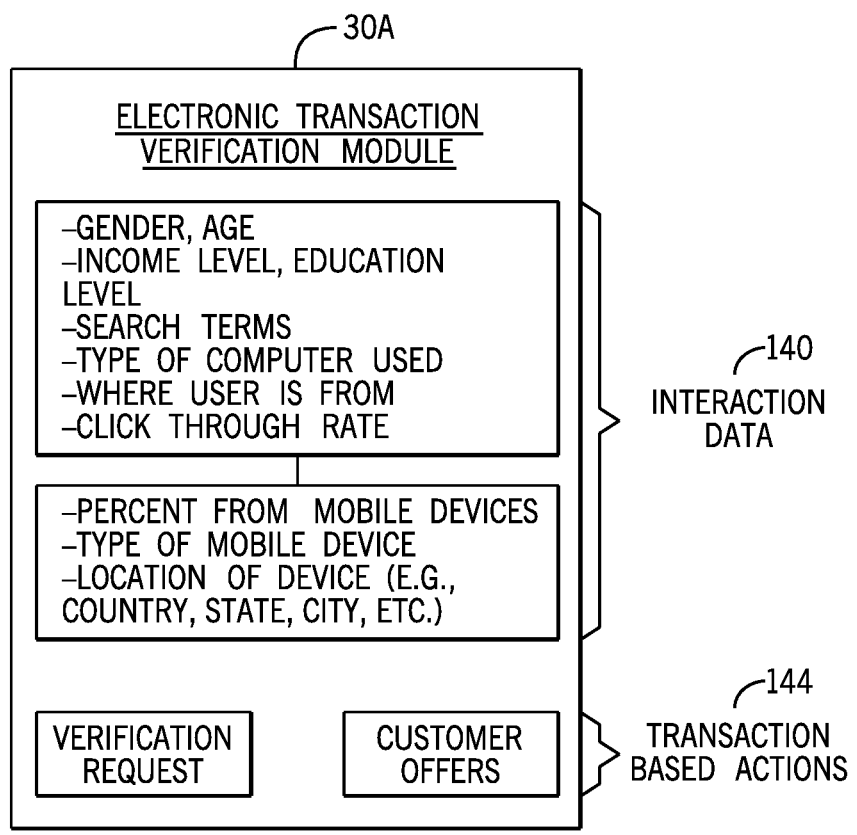
FIG. 4 is a logic diagram of an example of an electronic transaction verification module that may be used to generate customer offers, in accordance with an embodiment.

The diagram 150 of FIG. 4 illustrates a data structure of the electronic transaction verification module 30A. The electronic transaction verification system 30 may generate different transaction based actions 144 (e.g., verification requests or customer offers) based on the interaction data 140. As described above, a company or other interested party can request a verification request to confirm that their website and/or application was the source of the user's 134 web traffic to the third-party site (i.e., True Car).

As described herein, the electronic transaction verification system 30 may also generate customer offers based on the interaction data 140. Continuing the example above, the user 134 may have specified a type of rental car. For example, if the user 134 specified that he or she would like to rent a luxury car, the electronic transaction verification system 30 may generate customer offers based in part on the parameters that the user 134 entered.

Further, blockchain record of the interaction data may be provided to the entity of the originating source of the referral. In one embodiment, the blockchain record provides recording of interactions that is verified and maintained by an independent party.

The electronic transaction verification system 30 may access the interaction data 140 to generate the customer offers. Examples of the interaction data 140 that may be used to generate the customer offers may include interaction via platform-specific interactions that may include, but are not limited to, percentage of transactions made via a mobile device through a mobile application, a type of mobile device, and/or a location of the mobile device (e.g., GPS location, city, state, etc.). In one non limiting example, the electronic transaction verification system 30 may access the interaction data 140 to generate customer offers for a certain location based on the user's current or home location. Indeed, the electronic transaction verification system 30 may generate the customized car purchasing incentives at car dealerships located nearby the customer's current location. Additionally or alternatively, the electronic transaction verification system 30 may generate the customized car purchasing incentives at car dealerships located near the customer's home-base.

The electronic transaction verification system 30 may take into account the parameters entered for the electronic transaction as well. For example, in the example in which the user 134 indicated that he wanted to rent a luxury rental car, the electronic transaction verification system 30 may generate customized car purchasing incentives at luxury car dealerships. The electronic transaction verification system 30 may also receive interaction data 140 about the user 134 including, but not limited to, the user's age, gender, income level, education level, search terms used to access the transaction, type of computer used, where user is from, click through rate, among many other types of information. Based on certain interaction data 140, the electronic transaction verification system 30 may also generate customized offers. For example, the electronic transaction verification system 30 may generate interest free financing offers for users 134 that have a certain income level.

Figure 5:
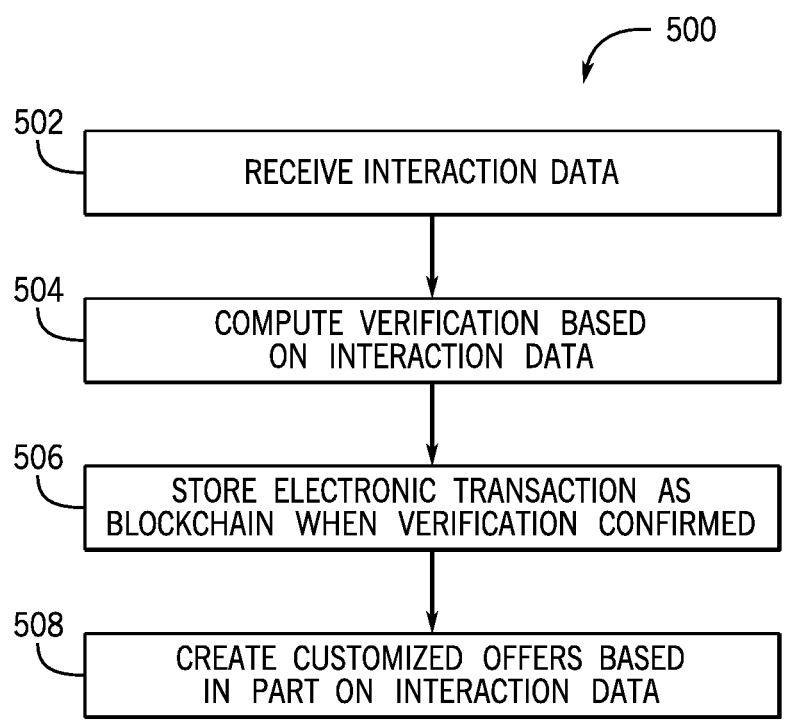
FIG. 5 is a flow chart of a method to validate an electronic transaction using the system of FIG. 1, in accordance with an embodiment.

FIG. 5 is a flow chart of a method 500 to validate an electronic transaction using the system of FIG. 1. The electronic transaction verification system 30 may receive interaction data (block 502). As described above, the interaction data may include accessing a transaction completion tool. The interaction data may also provide information about the user such as the user's age, gender, income level, education level, search terms used to access the transaction, type of computer used, where user is from, click through rate, among many other types of information. Further, the interaction data may include, but are not limited to, platform-specific information such as a percentage of transactions made via a mobile device through a mobile application, a type of mobile device, and/or a location of the mobile device.

The electronic transaction verification system 30 may complete a transaction verification based in part on the interaction data interactions (block 504). As describe above, the electronic transaction verification system 30 may determine that a unique link, purchase button, or complete transaction button was used to link the user 134 to the third-party site to finish the electronic transaction. The unique link, purchase button, or complete transaction button may include a source identifier to indicate the original source of the transaction. As discussed above, the transaction completion tool may contain a particular reference to the particular company so that the electronic transaction verification system 30 can identify the source of the referral to the third-party site.

The electronic transaction verification system 30 may then determine the source of the electronic transaction is confirmed by registering the source of the electronic purchase, (e.g., when the verification request is confirmed), and an immutable record is created and stored in the blockchain (block 506). By creating an immutable record, the referring company can prove that their website and/or application was the source of the user's 134 web traffic and subsequent transaction with the third-party site.

The electronic transaction verification system 30 may also generate customized offers based in part on the interaction data (block 508), as described above. For example, the electronic transaction verification system 30 may generate customized car purchasing incentives at car dealerships located near the customer's home-base.

Figure 6:
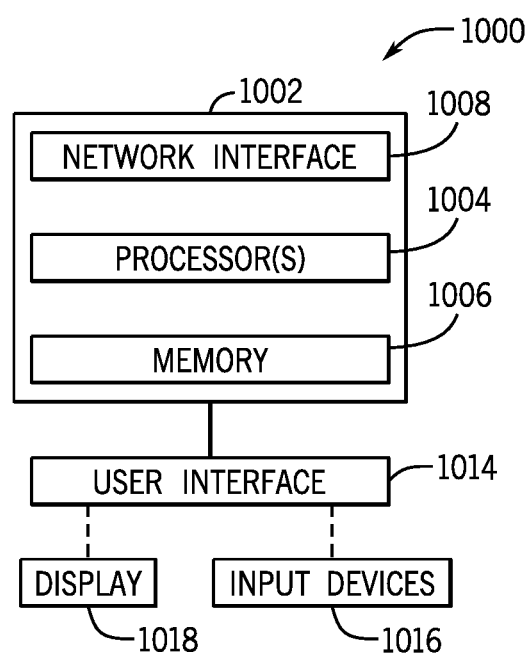
FIG. 6 is a computer system that may be used to implement electronic devices such as the blockchain nodes and the access nodes described herein.

FIG. 6 illustrates a computer system 1000 that may be used to implement electronic devices such as the blockchain nodes 104A, 104B, 104C, and 104D and the access nodes 112 described herein. The computer system 1000 may include a processing unit 1002, which may include one or more processors 1004 and one or more memories 1006. The one or more processors 1004 may refer to a single application specific integrated circuit (ASIC), to multiple ASICs, or to soft processing circuitry implemented in programmable logic devices, such as FPGAs and PLDs. The one or more processors 1004 may implement universal processing architectures, such as a complex instruction set computer (CISC) architecture or a reduced instruction set computer (RISC) architecture. The one or more processors 1004 may implement specialized processing architectures that may include instructions that include, but are not limited to, operations for blockchain mining.

The one or more memories 1006 may include volatile memory for performance of operations (e.g., random access memory (RAM)) and persistent memory for long-term storage (e.g., hard disks, solid-state devices). Long-term storage may be optimized for durability and/or access speed times by resorting to configurations such as a redundant array of independent disks (RAID) device. A network interface 1008 may be Ethernet-based connections, including copper wire network connections, backplane connections, and/or a wireless (e.g., Wi-Fi) network connections. The network interface 1008 may also be implemented using other communication standards including, but not limited to, peripheral component interface express (PCIe) connections, Bluetooth connections, Interlaken connections, universal serial bus (USB) connections, and any other method for transmission of information between the blockchain nodes 104A-D and between access nodes 112 and blockchain nodes 104A-D. In access nodes 112, network interface 1008 may also facilitate integration between the API 132 and other computation resources of an organization (e.g., accounting management applications). The access nodes 112 and blockchain nodes 104A-D may also include user interfaces 1014 of the system 1000. The user interfaces 1014 may include input devices 1016 and display devices 1018. Examples of input devices 1016 include keyboards, touchscreen, mouse, touchpads, track point, and other pointing devices. Examples of display devices 1018 include computer monitors, console terminals, and printers.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

What is claimed is:

1. A blockchain system, comprising:
a blockchain node comprising a memory and a miner; and
an access node coupled to the blockchain node configured to:
receive a verification request indicative of an electronic transaction, wherein the verification request comprises a source of the electronic transaction; and
convert a state of the electronic transaction into binary code for storage and execution by the miner;
wherein the miner is configured to:
register the source of the electronic transaction as a blockchain record of the electronic transaction in the blockchain system in response to verifying the source of the electronic transaction;
receive an information request for the blockchain record; and
transmit, responsive to the information request, the blockchain record to an application to cause the application to generate an offer to a user associated with the blockchain record based on interaction data associated with the user, wherein the application is configured to display the offer.

2. The blockchain system of claim 1, wherein the miner is configured to:
receive a transaction request to change the state of the verification request; and
perform one or more operations to change the state of the verification request based in part on the transaction request; and
record the changed state of the verification request in the memory.

3. The blockchain system of claim 1, wherein the offer is generated based on a type of the electronic transaction.

4. The blockchain system of claim 1, wherein the miner is configured to:
receive one or more parameters associated with the electronic transaction; and
generate the offer to the user based on the one or more parameters.

5. The blockchain system of claim 1, wherein the miner is configured to receive the interaction data comprising a user profile of the user, information about one or more click-throughs, and platform specific information.

6. The blockchain system of claim 5, wherein the user profile comprises a demographic of the user and the offer is based on the demographic of the user.

7. The blockchain system of claim 1, wherein the interaction data comprises a percentage of transactions made via a mobile device through a mobile application, a type of mobile device, and/or a location of the mobile device.

8. The blockchain system of claim 7, wherein the offer is generated based on the location of the mobile device.

9. The blockchain system of claim 1, wherein the offer is generated based on the source of the electronic transaction.

10. The blockchain system of claim 1, wherein the miner is configured to register the offer associated with the electronic transaction in the blockchain system.

11. The blockchain system of claim 1, wherein the source of the electronic transaction comprises a referral website configured to link to a third-party website.

12. The blockchain system of claim 11, wherein the source of the electronic transaction comprises a transaction completion tool referring to the referral website.

13. The blockchain system of claim 1, wherein the electronic transaction comprises an online booking for a vehicle rental, a hotel room, event tickets, or any combination thereof.

14. A blockchain system, comprising:
- a blockchain node comprising a memory and a miner, wherein the miner is configured to update the blockchain node based on a verification request; and
- an access node coupled to the blockchain node and comprising an application program interface (API), wherein the access node is configured to:
  - receive the verification request indicative of an electronic transaction, wherein the verification request comprises a source of the electronic transaction; and
  - convert a state of the electronic transaction into binary code for storage and execution by the miner,
  - wherein the miner is configured to:
    - register the source of the electronic transaction as a blockchain record of the electronic transaction in the blockchain system in response to verifying the source of the electronic transaction;
    - receive an information request for the blockchain record; and
    - transmit, responsive to the information request, the blockchain record to the API to cause the API to generate and display an offer to a user associated with the blockchain record, wherein the offer is generated based on interaction data associated with the user.

15. The blockchain system of claim 14, wherein the API is configured to convert the state of the electronic transaction or a function of the electronic transaction into a binary message for storage and execution by the miner.

16. The blockchain system of claim 14, wherein the electronic transaction comprises an online booking.

17. The blockchain system of claim 16, wherein the verification request comprises a request to track a source of the online booking, a request to monitor a balance of transactions associated with a purchase during the online booking, or both.

18. The blockchain system of claim 14, wherein the miner is configured to receive a transaction request comprising a request to change a state of the verification request based on the transaction request.

19. The blockchain system of claim 14, wherein the offer is generated based on a type of the electronic transaction.

20. The blockchain system of claim 14, wherein the API is configured to convert or compile the electronic transaction and the information request into a binary message for storage and execution by the miner.

* * * * *